(No Model.)
J. H. CALDWELL.
ELECTRIC LIGHT MAST ARM.
No. 476,607. Patented June 7, 1892.
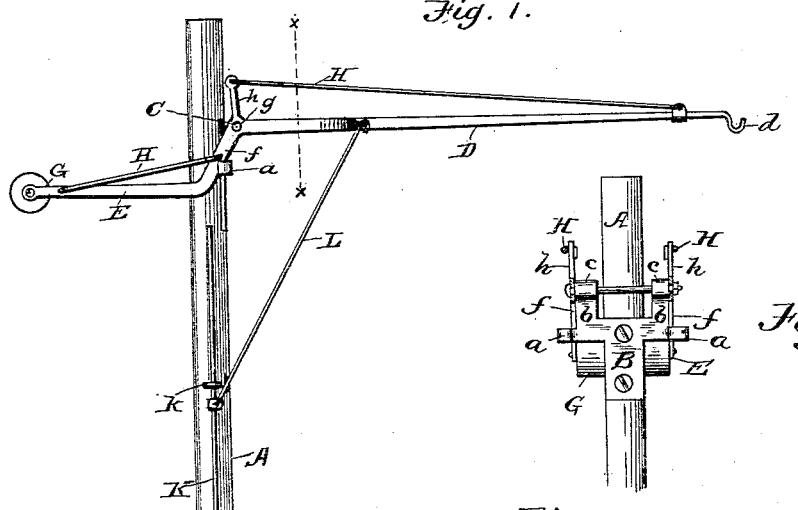
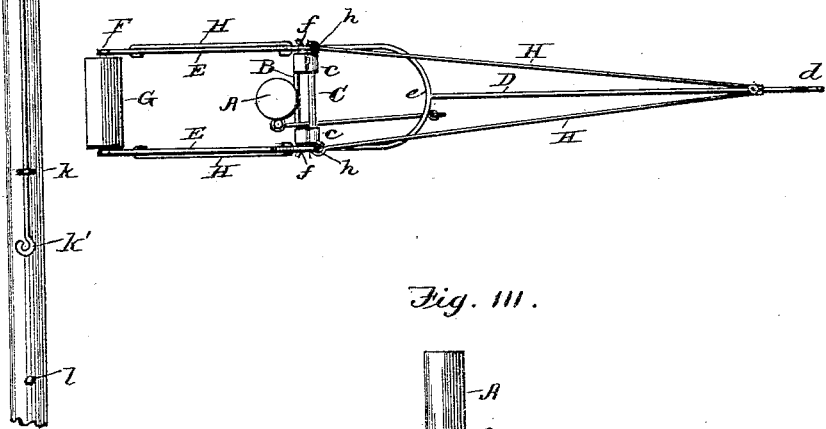
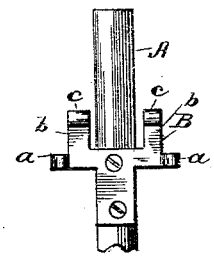
Witnesses
Wm. H. H. Knight
Arthur L. Bryant
Inventor
John H. Caldwell
By his Attorneys
Edson Bros.

UNITED STATES PATENT OFFICE.

JOHN H. CALDWELL, OF PHILADELPHIA, PENNSYLVANIA.

ELECTRIC-LIGHT MAST-ARM.

SPECIFICATION forming part of Letters Patent No. 476,607, dated June 7, 1892.

Application filed June 19, 1891. Serial No. 396,794. (No model.)

*To all whom it may concern:*

Be it known that I, JOHN H. CALDWELL, a citizen of the United States, and a resident of Philadelphia, in the county of Philadelphia and State of Pennsylvania, have invented certain new and useful Improvements in Electric-Light Mast-Arms; and I do hereby declare the following to be a full, clear, and exact description of the invention, such as will enable others skilled in the art to which it appertains to make and use the same.

My invention relates to improvements in yard or mast arms for supporting electric lamps; and the objects are, first, to provide a simple and strong supporting-arm which can be readily attached to ordinary poles of different diameters and shapes and maintained at any desired elevation on such pole, and, secondly, to provide a supporting-arm which can be operated to bring the lamp carried thereby within reach of an attendant at the foot or base of the pole and which, after the lamp has been attached or adjusted, will be automatically returned to and maintained in its original elevated position.

My invention consists of the peculiar construction and arrangement of parts, as will be hereinafter more fully pointed out and claimed.

To enable others to readily understand my invention, I have illustrated the same in the accompanying drawings, in which—

Figure I is a side elevation of a pole having my improved yard-arm attached thereto. Fig. II is a top plan view. Fig. III is a detached detail view of the supporting-bracket, and Fig. IV is a similar view showing the arm in position.

Like letters of reference denote corresponding parts in all the figures of the drawings, referring to which—

A designates the pole, of any size and height from which it is desired to suspend an electric lamp. A bracket-plate B is rigidly and securely attached to this pole A at any desired height from the ground. This plate is provided at its upper end with outwardly-extending arms or lugs $a$ and with upwardly-extending lugs $b$, which lugs are formed with short bearings or sleeves $c$, in which is fitted a horizontal fulcrum-rod C.

D designates the mast-arm, which is provided at one end with a hook $d$, to which a lamp can be connected in the usual well-known or any desirable manner. The rear part of the mast or yard arm D consists of two parallel members E, which are united to the forward end of the arm by a segment $e$. These members E are bent at intermediate points of their length to bring the rear ends of the members in a plane below the forward end of the yard-arm, and the inclined part of the members E lies between the front and rear parts of the arm D, as shown in the drawings. The members E are further provided with openings $g$ to receive the ends of the fulcrum-rod C to pivotally support the yard-arm at an intermediate point of its length. The rear ends of the members E are connected and braced by a cross-bar F, on which is loosely fitted a counterbalanced weight G. The braces H extend from the rear ends of the members E to the inclined parts $f$ and from upwardly-extending arms $h$ to the front end of the arm D.

A vertical operating-rod K is fitted in suitable guides $k$, fixed to the pole A, and the lower end of this rod has a hook $k'$, adapted to take around a pin or stud $l$, secured in the lower portion of the pole when the said rod K is drawn down. The rod K is connected with the mast-arm D by a short rod or bar L.

The operation is as follows: The lamp is lowered by depressing the operating-rod K, which causes the yard-arm to turn on the fulcrum-rod C, and thus lower the lamp close to the pole near the base thereof. By reason of the deflected portion $f$ in the arm or mast the lamp is caused to lie close to the pole and the arm fits snugly thereto when it is inverted or turned to the vertical position. After the lamp has received necessary attention the arm D is automatically returned to its horizontal position by the weight G, which is on the opposite end of the yard-arm from the lamp, and the arm D is kept in a horizontal position and the weight G prevented from raising the lamp above the proper plane by reason of the inclined portions $f$ of the arm D coming in contact with the outwardly-extending lugs $a$ on the supporting-bracket B.

Having thus described and explained my invention, what I claim as new, and desire to secure by Letters Patent, is—

The combination of a supporting plate or bracket provided with lugs $a$, which extend beyond the sides of a pole to which the bracket is adapted to be secured, a rod supported by the bracket, a mast-arm pivotally connected to the ends of said rod and provided with the intermediate inclined portion $f$, the ends of the arm being in different planes, and means for turning the mast-arm on its pivots, substantially as described.

In testimony whereof I affix my signature in presence of two witnesses.

JOHN H. CALDWELL.

Witnesses:
JOHN MÖLLER,
J. C. MÖLLER.